United States Patent
Park et al.

(10) Patent No.: US 10,089,348 B2
(45) Date of Patent: Oct. 2, 2018

(54) COMPUTER DEVICE AND STORAGE DEVICE

(71) Applicant: Samsung Electronics Co., Ltd., Suwon-si, Gyeonggi-do (KR)

(72) Inventors: Young Jin Park, Incheon (KR); Chan Ik Park, Suwon-si (KR); Sung Ho Cho, Hwaseong-si (KR)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 304 days.

(21) Appl. No.: 14/828,616

(22) Filed: Aug. 18, 2015

(65) Prior Publication Data

US 2016/0055198 A1 Feb. 25, 2016

(30) Foreign Application Priority Data

Aug. 19, 2014 (KR) ........................ 10-2014-0107477

(51) Int. Cl.
  *G06F 17/00* (2006.01)
  *G06F 17/30* (2006.01)

(52) U.S. Cl.
  CPC .. *G06F 17/30371* (2013.01); *G06F 17/30082* (2013.01); *G06F 17/30106* (2013.01); *G06F 17/30144* (2013.01)

(58) Field of Classification Search
  None
  See application file for complete search history.

(56) References Cited

U.S. PATENT DOCUMENTS

| | | | |
|---|---|---|---|
| 8,527,544 B1 | 9/2013 | Colgrove et al. | |
| 8,533,384 B2 | 9/2013 | Olbrich et al. | |
| 9,715,447 B2* | 7/2017 | Lin | G06F 12/0246 |
| 2012/0011340 A1 | 1/2012 | Flynn et al. | |
| 2012/0036165 A1 | 2/2012 | Driesen et al. | |
| 2012/0054465 A1 | 3/2012 | Post et al. | |
| 2012/0079174 A1 | 3/2012 | Nellans et al. | |
| 2012/0084492 A1 | 4/2012 | Stenfort | |
| 2012/0110249 A1* | 5/2012 | Jeong | G06F 3/0616 |
| | | | 711/103 |
| 2012/0144097 A1* | 6/2012 | Hashimoto | G06F 12/0246 |
| | | | 711/103 |
| 2012/0198175 A1 | 8/2012 | Atkisson | |

(Continued)

OTHER PUBLICATIONS

Do, Jaeyoung, et al. "Query processing on smart SSDs: opportunities and challenges." Proceedings of the 2013 ACM SIGMOD International Conference on Management of Data. ACM, 2013.

(Continued)

*Primary Examiner* — Hung Le
(74) *Attorney, Agent, or Firm* — Harness, Dickey & Pierce, P.L.C.

(57) ABSTRACT

A computer device for controlling a storage device based on non-volatile memory is provided. The computer device includes a file modification detector configured to detect whether a data structure in a database file has been deleted using an identifier recorded in the database file to indicate whether the data structure is deleted or not; and a command generator configured to generate an advanced-trim command including information corresponding to the deleted data structure and to transmit the command to the storage device.

19 Claims, 16 Drawing Sheets

(56) References Cited

U.S. PATENT DOCUMENTS

| | | | |
|---|---|---|---|
| 2012/0246388 A1* | 9/2012 | Hashimoto | G06F 12/0246 711/103 |
| 2013/0086006 A1 | 4/2013 | Colgrove et al. | |
| 2013/0116976 A1 | 5/2013 | Kanemasa et al. | |
| 2013/0166855 A1* | 6/2013 | Batwara | G06F 3/0608 711/154 |
| 2013/0227201 A1 | 8/2013 | Talagala et al. | |
| 2013/0232118 A1 | 9/2013 | Reid et al. | |
| 2013/0232290 A1 | 9/2013 | Ish et al. | |
| 2014/0074782 A1* | 3/2014 | Green | G06F 3/061 707/620 |
| 2014/0195725 A1* | 7/2014 | Bennett | G06F 12/0246 711/103 |
| 2014/0344507 A1* | 11/2014 | Piggin | G06F 12/0246 711/103 |
| 2015/0074371 A1* | 3/2015 | Hashimoto | G06F 3/06 711/202 |
| 2015/0089179 A1* | 3/2015 | Kurita | G06F 3/0659 711/170 |
| 2015/0161039 A1* | 6/2015 | Yeh | G06F 12/0246 711/103 |
| 2015/0205717 A1* | 7/2015 | Lin | G06F 12/0246 711/103 |
| 2015/0212937 A1* | 7/2015 | Stephens | G06F 3/0626 711/103 |

OTHER PUBLICATIONS

Lawrence, Jessie, "How to enable TRIM support for your SSD", Corsair Blog, Aug. 13, 2010.

* cited by examiner

FIG. 9

| FLAG | POSITION |
|---|---|
| FLAG1 | (5,5) |
| FLAG2 | (10,5) |
| FLAG3 | (100,30) |
| ⋮ | ⋮ |

COMPUTER DEVICE AND STORAGE DEVICE

CROSS-REFERENCE TO RELATED APPLICATIONS

This application claims priority under 35 U.S.C. § 119(a) from Korean Patent Application No. 10-2014-0107477 filed on Aug. 19, 2014, the disclosure of which is hereby incorporated by reference in its entirety.

BACKGROUND

Embodiments of the inventive concepts relate to a computer device and a storage device.

When an operating system (OS) deletes a file, a storage device does not erase a whole data block corresponding to the file but flags the block as "not in use". When the storage device is a solid state drive (SSD), the block is erased before data is newly written to the block, which causes write performance to deteriorate.

To reduce performance deterioration, trim is used. When trim is used, an OS informs an SSD of cells not in use and the SSD invalidates the cells. Thereafter, the SSD can erase the cells in block units. To trigger trim, the OS in a host deletes a file first. Thereafter, the OS transmits a trim command to the SSD. Then, the SSD can invalidate the cells according to the trim command during an idle time of the host.

Meanwhile, a database (DB) can be managed as a single file. When a data structure (e.g., a table, a row, or a field) inside the DB is deleted, the file itself is not deleted, and therefore, trim does not operate. Therefore, even when a large amount of a data structure is deleted from the DB, an SSD does not erase a block corresponding to the data structure. As a result, inefficiency occurs in terms of available capacity and data writing speed of the SSD.

SUMMARY

Some embodiments of the inventive concepts provide a storage device having an increased capacity and writing speed and a computer device for controlling the same.

According to some embodiments of the inventive concepts, there is provided a computer device for controlling a storage device. The computer device includes a file modification detector configured to detect whether a data structure in a database file has been deleted using an identifier recorded in the database file to indicate whether the data structure is deleted or not and a command generator configured to generate an advanced-trim command including information corresponding to the deleted data structure and to transmit the command to the storage device.

The data structure may be a table, a row, or a field.

The file modification detector and the command generator may be run by a database engine of the computer device.

Alternatively, the file modification detector and the command generator may be run by a filter driver of the computer device. The filter driver may generate the advanced-trim command according to a file modification command output from the database engine of the computer device.

According to other embodiments of the inventive concepts, there is provided a computer system including the above-described computer device and the storage device. The database file may be a structured query language (SQL) database file and the storage device may be a solid state drive (SSD).

According to further embodiments of the inventive concepts, there is provided a storage device including a data structure deletion detector configured to detect whether a data structure in a database file has been deleted using an identifier recorded in the database file to indicate whether the data structure is deleted or not and an invalidator configured to invalidate cells that store the deleted data structure. The data structure has a smaller capacity than the database file.

The invalidator may invalidate the cells during an idle time of a host.

The storage device may further include a data shifter configured to shift data of a cell that has not been invalidated to at least one of the cells that have been invalidated.

The data structure deletion detector may receive an advanced-trim command including information corresponding to the deleted data structure from the host and detect whether the data structure in the file has been deleted according to the advanced-trim command. The invalidator may invalidate the cells that store the deleted data structure according to the information corresponding to the deleted data structure.

Alternatively, the data structure deletion detector may search files stored in the storage device for the database file, search flag information corresponding to the identifier in the database file, analyze the flag information and detect whether the data structure in the database file has been deleted. The invalidator may invalidate the cells that store the data structure according to the flag information.

The storage device may further include a data shifter configured to shift data of a cell that has not been invalidated to at least one of the cells that have been invalidated according to a pattern of flag positions indicated by the flag information.

The database file may be every database file in the storage device or a database file selected according to an input from the host.

The invalidator may invalidate at least one cell that stores an address of a flag included in the database file.

The data structure deletion detector may analyze the flag information of the database file according to an input from the host or during an idle time of the host or a desired time.

The storage device may perform a trim function to invalidate cells storing the database file upon deletion of the file and perform an advanced-trim function to invalidate cells storing the data structure upon deletion of the data structure in the database file. The storage device may perform the trim function and the advanced-trim function according to a priority set by a host or according to a desired priority.

The storage device may further include a three-dimensional memory array.

In one embodiment, computer device for controlling a storage device including non-volatile memory includes a memory configured to store computer-readable instructions; and a processor configured to execute the computer-readable instructions to detect whether a data structure in a database file stored in the non-volatile memory is being deleted and to generate a command that causes the storage device to invalidate cells in the non-volatile device corresponding to the data structure.

In one embodiment, a storage device, includes a main memory, and the main memory is a non-volatile memory. The storage device further includes a controller configure to detect whether a data structure in a database file stored in the non-volatile memory is being deleted, and to invalidate cells in the main memory corresponding to the data structure.

In one embodiment, the controller is configured to detect the data structure based on a command.

In another embodiment, the controller is configured to detect the data structure based on flag information stored in the database in association with the data structure.

BRIEF DESCRIPTION OF THE DRAWINGS

The above and other features and advantages of the inventive concepts will become more apparent by describing in detail example embodiments thereof with reference to the attached drawings in which:

FIG. 9 is a diagram of flag information stored in a data structure according to some embodiments of the inventive concepts;

DETAILED DESCRIPTION OF THE EMBODIMENTS

Figure 1:
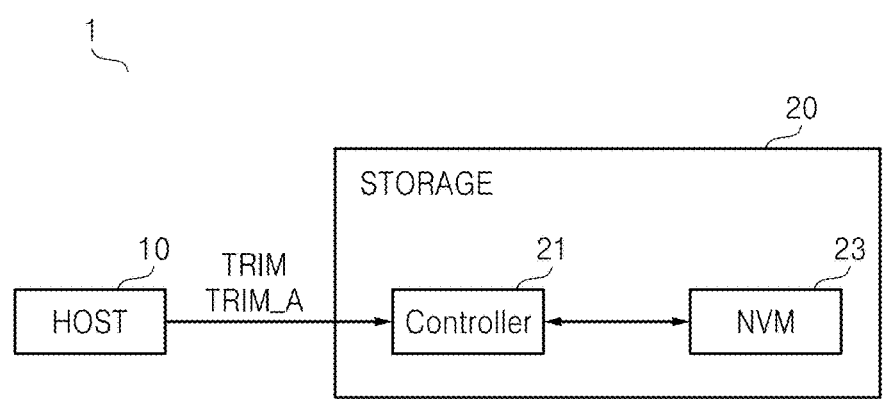
FIG. 1 is a block diagram of a computer system according to some embodiments of the inventive concepts.

Example embodiments of inventive concepts will be described more fully hereinafter with reference to the accompanying drawings, in which some example embodiments are shown. These inventive concepts may, however, be embodied in many different forms and should not be construed as limited to the example embodiments set forth herein. Rather, these example embodiments are provided so that this disclosure will be thorough and complete, and will fully convey the scope of the example embodiments of the inventive concepts to those skilled in the art. In the drawings, the size and relative sizes of layers and regions may be exaggerated for clarity. Like numbers refer to like elements throughout.

Example embodiments will now be described more fully with reference to the accompanying drawings, in which some example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a computer system 1 according to some embodiments of the inventive concepts. The computer system 1 may be implemented as a handheld device such as a cellular phone, a smart phone, a tablet computer, a personal digital assistant (PDA), an enterprise digital assistant (EDA), a digital still camera, a digital video camera, a portable multimedia player (PMP), a personal navigation device or portable navigation device (PND), a handheld game console, or an e-book. In other embodiments, the computer system 1 may be implemented as a personal computer (PC) or a data server. The computer system 1 may include a host 10 and a storage device 20.

The host 10 may control the overall operation of the storage device 20. The host 10 may be implemented as a system on chip (SoC). The host 10 may run an operating system (OS) that supports a file system.

The storage device 20 may be an all-in-one data storage device. According to some embodiments, the storage device 20 may be implemented as a solid state drive or disk (SSD), a multimedia card (MMC), an embedded MMC (eMMC), or a universal flash storage (UFS).

The host 10 and the storage device 20 may communicate using serial advanced technology attachment (SATA), serial attached SCSI (small computer system interface) (SAS), or peripheral component interconnect express (PCIe). The storage device 20 includes a controller 21 and a non-volatile memory (NVM) 23.

Once a file is deleted, the host 10 may transmit a trim command TRIM to the storage device 20 to invalidate cells storing the file in the NVM 23 of the storage device 20. When a data structure in a file is deleted due to the modification of the file, the host 10 may transmit an advanced-trim command TRIM_A to the storage device 20 to invalidate cells storing the data structure.

The controller 21 may receive the trim command TRIM or the advanced-trim command TRIM_A from the host 10 and may control the NVM 23 in response to the command TRIM or TRIM_A. The NVM 23 may store data transmitted from the host 10. The NVM 23 may retain stored data even when powered off. The NVM 23 may include NAND flash memory, NOR flash memory, phase-change random access memory (PRAM), ferroelectric RAM (FRAM), resistive RAM (RRAM), or magnetoresistive RAM (MRAM).

In an embodiment of the present inventive concepts, the NVM 23 may include a three dimensional (3D) memory array (not shown). The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concepts, the 3D memory array includes vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 2:
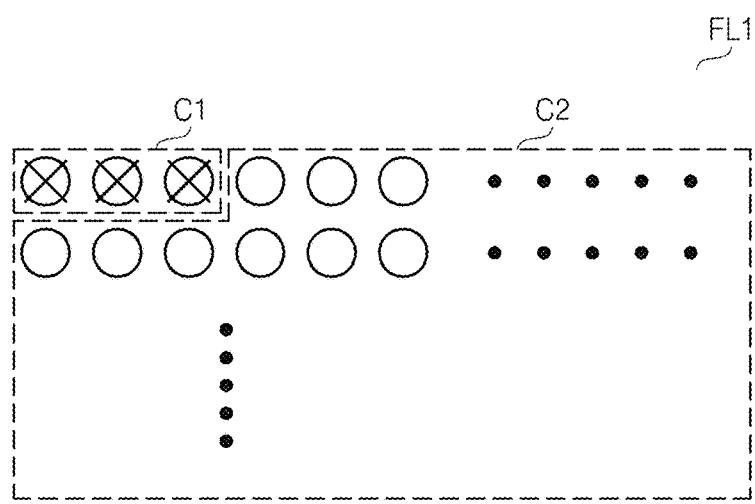
FIG. 2 is a diagram illustrating the process of a storage device when a host deletes a file.

FIG. 2 is a diagram illustrating the process of the storage device 20 when the host 10 deletes a file. Referring to FIGS. 1 and 2, a file FL1 stored in the storage device 20 may include a plurality of letters, symbols, and special characters. For instance, the file FL1 may include a first special character group C1 and a second special character group C2.

When the host 10 deletes the file FL1, the storage device 20 may flag a data block corresponding to the file FL1 as not in use instead of erasing the whole data block. Accordingly, the host 10 can process the file deletion quickly. For instance, the storage device 20 may invalidate only cells that store the first special character group C1 of the file FL1 and may maintain cells storing the second special character group C2 valid.

When data is rewritten to the storage device 20 which is a hard disk drive (HDD), speed is not decreased even if data is overwritten. However, when the storage device 20 is an SSD, the block corresponding to the file FL1 is to be erased first in order to rewrite data to the block. As a result, performance deteriorates during a write operation.

In order to reduce or prevent the performance deterioration, a trim function may be used. When the host 10 transmits the trim command TRIM to the storage device 20 to inform the storage device 20 about cells not in use (e.g., the cells storing the first special character group C1) which corresponds to the file FL1 that has been deleted, the storage device 20 can invalidate the cells not in use during an idle time of the host 10. Thereafter, the storage device 20 can increase an available capacity through garbage collection and block erase.

Figure 3:
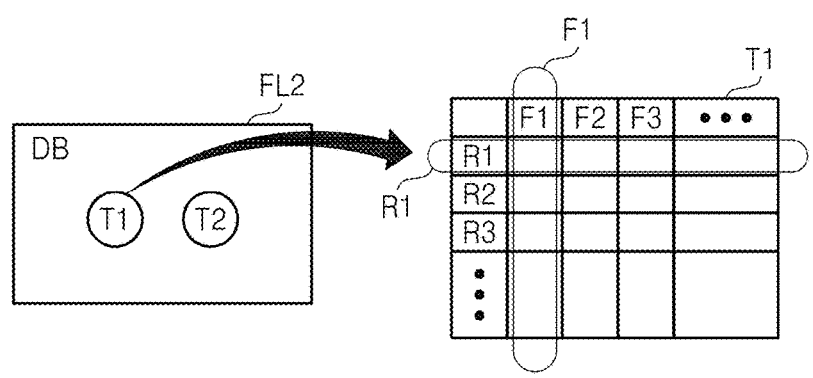
FIG. 3 is a diagram of the structure of a database (DB) file stored in the storage device.

FIG. 3 is a diagram of the structure of a database (DB) file stored in the storage device 20. Referring to FIGS. 1 and 3, the host 10 may execute a DB management system (DBMS). DBMS is software that organizes and stores data for efficient use of data. The DBMS may be hierarchical DBMS, network DBMS, relation DBMS (RDBMS), object-oriented DBMS, or object-relation DBMS. The DBMS may include a column-oriented DBMS or a row-oriented DBMS. For instance, the DBMS may be MySQL (Structured Query Language), PostgreSQL, SQLite, Microsoft SQL Server, Microsoft Access, Oracle, SAP, dBase, FoxPro, IBM DB2, or FilemakerPro.

The DBMS may manage a DB as at least one DB file FL2. The DB file FL2 may include a plurality of tables, e.g., a first table T1 and a second table T2. Each table, for example, the first table T1 may include a plurality of rows (or referred to as records), e.g., a first row R1, a second row R2, and a third row R3. The first table T1 may also include a plurality of fields F1, F2, and F3. Each row, for example, the first row R1 may include a data value corresponding to each of the fields F1, F2, and F3.

When a file is deleted, the host 10 may transmit the trim command TRIM to the storage device 20. However, when a data structure (e.g., a table, a row, or a field) in a DB is deleted, the host 10 does not transmit the trim command TRIM to the storage device 20 since a file has not been deleted.

According to some embodiments of the inventive concepts, when a data structure in a file (e.g., a DB file) is deleted, the host 10 can transmit the advanced-trim command TRIM_A to the storage device 20. The storage device 20 may perform an operation corresponding to trim in response to the advanced-trim command TRIM_A. As a result, the available capacity and data write speed of the storage device 20 are increased.

Figure 4:
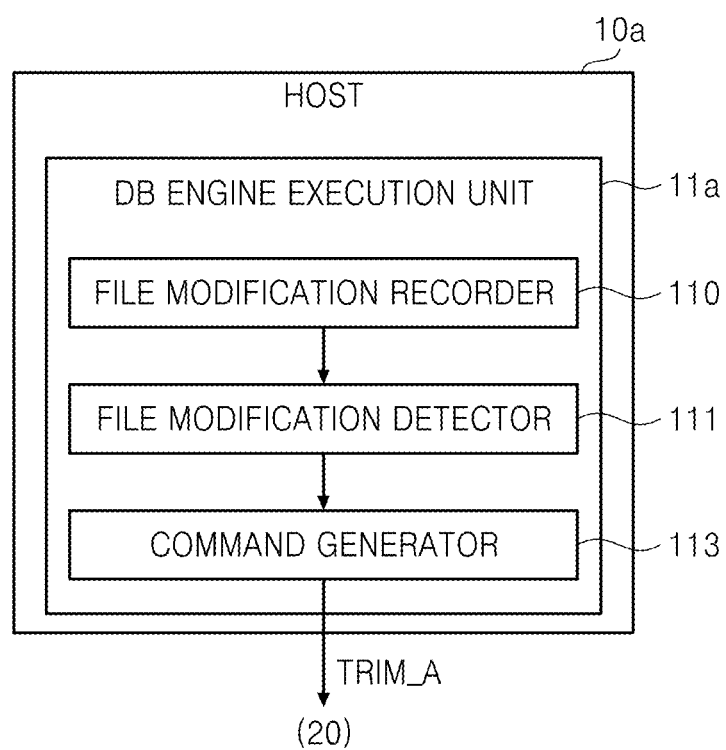
FIG. 4 is a diagram of an example of the host illustrated in FIG. 1.
Figure 14:
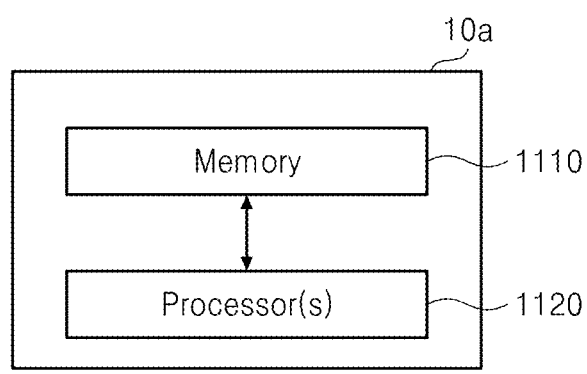
FIG. 14 illustrates an embodiment of a host according to some inventive concepts.

FIG. 4 is a diagram of an example 10a of the host 10 illustrated in FIG. 1. Referring to FIG. 4, the host 10a may include a DB engine execution unit 11a. The DB engine execution unit 11a may execute a DB engine (e.g., an SQL server engine). The DB engine execution unit 11a may include a file modification recorder 110, a file modification detector 111, and a command generator 113. The DB engine execution unit 11a may be implemented in hardware, software, or combination thereof. For example, as shown in FIG. 14, the host 10a may include one or more processors 1120 that are designed to sequentially and automatically carry out a sequence of arithmetic or logical operations; equipped to record/store digital data on a machine readable medium; and transmit and receive digital data. The one or more processors 1120 may be configured to carry out instructions of a computer program by performing the basic arithmetical, logical, and input/output operations. The one or more processors may include a single-core processor, a dual-core processor, a triple-core processor, a quad-core processor, etc. The one or more processors may perform a variety of functions for the host 10a and may process data by executing program code, one or more software modules, firmware, middleware, microcode, hardware description languages, and/or any other like set of instructions stored in the memory. The program code may be provided to the one or more processors by a memory 1110. The memory 1110 may be a computer readable storage medium that generally includes a random access memory (RAM), read only memory (ROM), a flash memory device, and/or other like storage media capable of storing and recording data. In order to perform the variety of functions and data processing operations, the program code and/or software components are loaded into the one or more processors 1120. Once the program code is loaded into the one or more processors 1120, the one or more processors 1120 may be programmed to perform the various operations and functions delineated by the program code, thereby transforming the one or more processors 1120 into a special purpose processor such as the DB engine execution unit 11a for performing an advanced trim.

When a data structure (e.g., a table, a row, or a field) in a DB file is deleted, the file modification recorder 110 may record an identifier (e.g., flag information) indicating that the data structure has been deleted in the DB file.

The file modification detector 111 may detect whether a data structure (e.g., a table, a row, or a field) in a file (e.g., an SQL DB file) has been deleted according to the modification of the file. For instance, the file modification detector 111 may detect that the data structure (e.g., a table, a row, or a field) has been deleted using flag information in the DB file.

Upon the deletion of the data structure, the command generator 113 may generate the advanced-trim command TRIM_A including information (e.g., at least one among a DB file name, a file address, a start address of the deleted data structure, an end address thereof, and a data size) indicating the deleted data structure and transmit the advanced-trim command TRIM_A to the storage device 20. Consequently, the host 10a transmits the advanced-trim command TRIM_A to the storage device 20 through a DB engine without using an OS.

The advanced-trim command TRIM_A may include a file name corresponding to the deleted data structure, a file address, and an address (e.g., a start address, a data size, or an end address) corresponding to a portion modified in the file.

An application programming interface (API) file may be installed in the host 10a and an execution file of a DB engine may be newly compiled, so that the DB engine can support an advanced-trim. Alternatively, instead of an API file, a source of development, software development kit (SDK), or a library file maybe installed in the host 10a as the software for supporting an advanced-trim.

Figure 5:
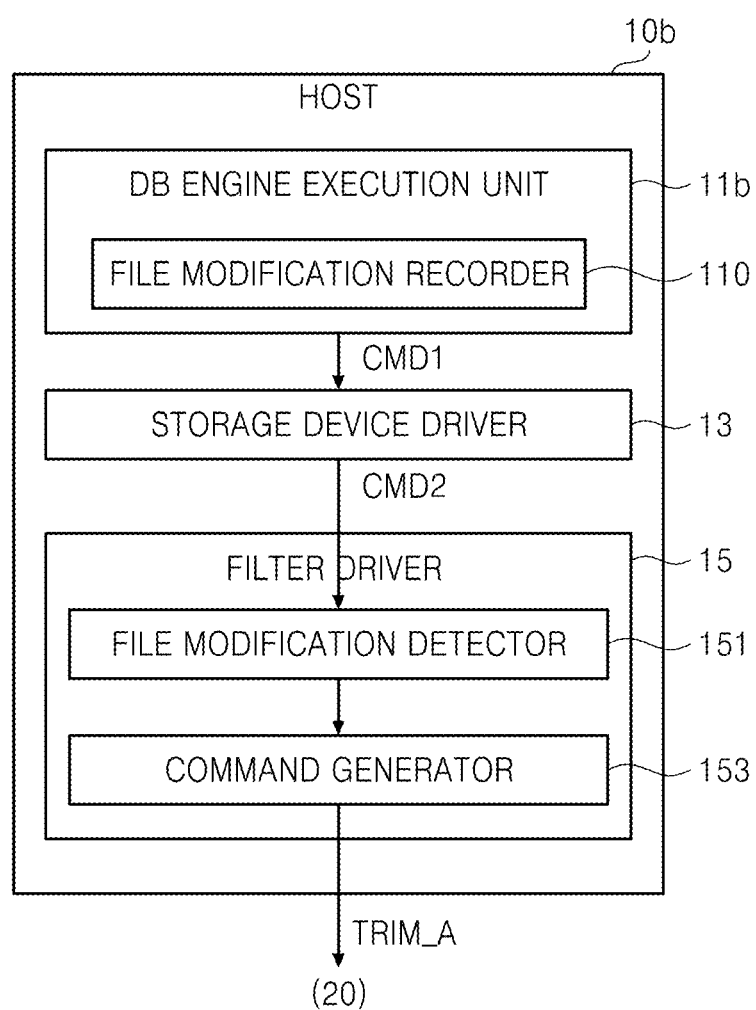
FIG. 5 is a diagram of another example of the host illustrated in FIG. 1.

FIG. 5 is a diagram of another example 10b of the host 10 illustrated in FIG. 1. Referring to FIGS. 1 and 5, the host 10b may include a DB engine execution unit 11b, a storage device driver 13, and a filter driver 15. The DB engine execution unit 11b, the storage device driver 13, and the filter driver 15 may be implemented in the same manner described above with respect to FIG. 14.

The DB engine execution unit 11b may execute a DB engine (e.g., an SQL server engine). The DB engine execution unit 11b may include the file modification recorder 110. When a data structure (e.g., a table, a row, or a field) in a DB file is deleted, the file modification recorder 110 may record an identifier (e.g., flag information) indicating that the data structure has been deleted in the DB file, as described above.

The DB engine execution unit 11b may transmit a first command CMD1 to the storage device driver 13 upon modification of a DB file (e.g., an SQL DB file) or deletion of a data structure in the DB file. The storage device driver 13 may transform the first command CMD1 into a second command CMD2 to meet the standard of the storage device 20 and transmit the second command CMD2 to the filter driver 15.

The filter driver 15 may include a file modification detector 151 and a command generator 153. The filter driver 15 may be implemented in hardware, software, or combination thereof. The filter driver 15 may be installed in an OS of the host 10b.

The file modification detector 151 may analyze the second command CMD2 and detect whether a data structure (e.g., a table, a row, or a field) in a file has been deleted upon modification of the file. For instance, the file modification detector 151 may detect that the data structure (e.g., a table, a row, or a field) has been deleted using flag information in the DB file. Upon the deletion of the data structure, the command generator 153 may modify the second command CMD2 to generate the advanced-trim command TRIM_A including information corresponding to the data structure and transmit the advanced-trim command TRIM_A to the storage device 20. The advanced-trim command TRIM_A may include a file name corresponding to the deleted data structure, a file address, and an address (e.g., a start address, a data size, or an end address) corresponding to a portion modified in the file.

In the embodiments illustrated in FIG. 4, the file modification detector 111 and the command generator 113 are implemented in the DB engine execution unit 11a, so that an advanced-trim function according to some embodiments of the inventive concepts is realized with modification of an existing DB program. Contrarily, in the embodiments illustrated in FIG. 5, the file modification detector 151 and the command generator 153 are implemented in the filter driver 15, so that an advanced-trim function according to some embodiments of the inventive concepts is realized without modification of an existing DB program.

Figure 6:
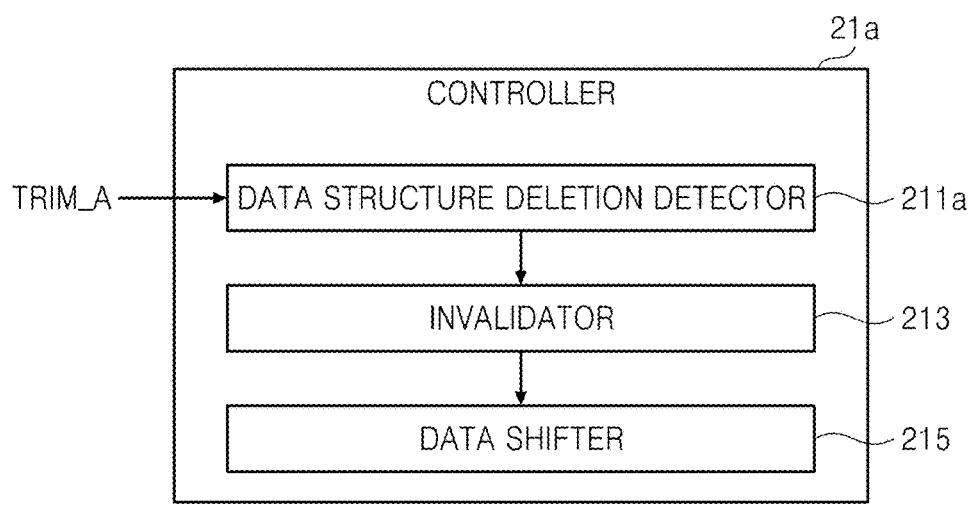
FIG. 6 is a diagram of an example of a controller illustrated in FIG. 1.

FIG. 6 is a diagram of an example 21a of the controller 21 illustrated in FIG. 1. Referring to FIGS. 1 and 6, the controller 21a may include a data structure deletion detector 211a and an invalidator 213.

The data structure deletion detector 211a may receive the advanced-trim command TRIM_A including information corresponding to a deleted data structure from the host 10 and may detect whether a data structure in a file has been deleted based on the advanced-trim command TRIM_A. The data structure may have smaller capacity than the file.

Upon the deletion of the data structure, the invalidator 213 may invalidate cells storing the data structure, i.e., real data corresponding to the data structure in the NVM 23. The invalidator 213 may invalidate the cells during an idle time of the host 10. The cells may be invalidated in units of pages. For instance, the invalidator 213 may record "invalid" in a validity field of a page corresponding to the deleted data structure among validity fields indicating validity of respective pages in the NVM 23.

A data shifter 215 may collect invalidated cells (e.g., an invalidated page) or valid cells (e.g., a valid page) by data blocks. The data shifter 215 may shift only valid cells (e.g., valid page) in each data block to a new data block using garbage collection and may erase a data block including invalidated cells only.

Figure 15:
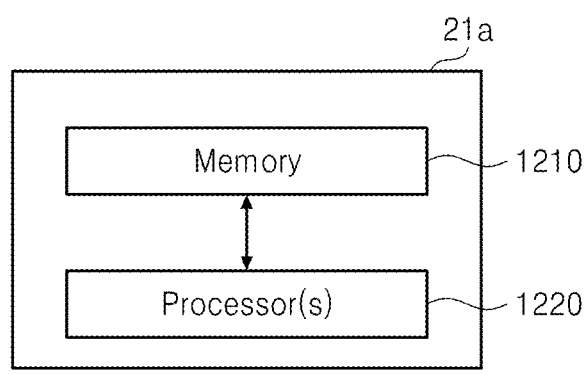
FIG. 15 illustrates an embodiment of a controller according to some inventive concepts.

The data structure deletion detector 211*a*, the invalidator 213, and the data shifter 215 may be implemented in hardware, software, or combination thereof. For example, as shown in FIG. 15, the controller 21*a* may include one or more processors 1220 that are designed to sequentially and automatically carry out a sequence of arithmetic or logical operations; equipped to record/store digital data on a machine readable medium; and transmit and receive digital data. The one or more processors 1220 may be configured to carry out instructions of a computer program by performing the basic arithmetical, logical, and input/output operations. The one or more processors may include a single-core processor, a dual-core processor, a triple-core processor, a quad-core processor, etc. The one or more processors may perform a variety of functions for the controller 21*a* and may process data by executing program code, one or more software modules, firmware, middleware, microcode, hardware description languages, and/or any other like set of instructions stored in the memory. The program code may be provided to the one or more processors by a memory 1210. The memory 1210 may be a computer readable storage medium that generally includes a random access memory (RAM), read only memory (ROM), a flash memory device, and/or other like storage media capable of storing and recording data. In order to perform the variety of functions and data processing operations, the program code and/or software components are loaded into the one or more processors 1220. Once the program code is loaded into the one or more processors 1220, the one or more processors 1220 may be programmed to perform the various operations and functions delineated by the program code, thereby transforming the one or more processors 1220 into a special purpose processor such as the data structure deletion detector 211*a*, the invalidator 213, and the data shifter 215.

Figure 7:
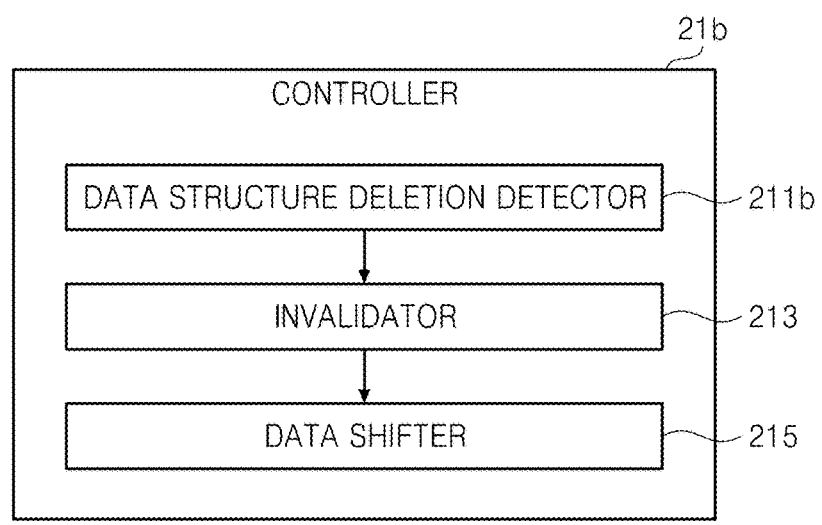
FIG. 7 is a diagram of another example of the controller illustrated in FIG. 1.

FIG. 7 is a diagram of another example 21*b* of the controller 21 illustrated in FIG. 1. The structure of the controller 21*b* illustrated in FIG. 7 is mostly the same as that of the controller 21*a* illustrated in FIG. 6. Thus, only differences between the controllers 21*a* and 21*b* will be described to avoid redundancy.

A data structure deletion detector 211*b* may perform an operation corresponding to trim in relation to a deleted data structure regardless of whether it receives the advanced-trim command TRIM_A from the host 10 or not. While the storage device 20 performs an advanced-trim operation in response to the advanced-trim command TRIM_A issued from the host 10 in the embodiments illustrated in FIG. 6, the storage device 20 autonomously performs an advanced-trim operation (referred to as an "auto advanced-trim operation" for convenience' sake in the description) without receiving the advanced-trim command TRIM_A from the host 10. In order to perform an auto advanced-trim operation, the host 10 may set configuration to enable the auto advanced-trim operation to the storage device 20 when the storage device 20 is powered on.

The data structure deletion detector 211*b* searches files stored in the NVM 23 for a DB file during an idle time. The data structure deletion detector 211*b* retrieves flag information from the DB file and finds out whether a data structure (e.g., a table, a row, or a field) has been deleted. The data structure deletion detector 211*b* also designates cells corresponding to the deleted data structure using the flag information. In other words, the data structure deletion detector 211*b* may set a start address or size of cells to be invalidated according to the flag information. The invalidator 213 may invalidate the cells designated by the data structure deletion detector 211*b*, i.e., real data corresponding to the data structure in the NVM 23.

The data shifter 215 may shift only valid cells (e.g., a valid page) from each data block to a new data block using garbage collection and then erase a data block including invalidated cells only. The auto advanced-trim operation mentioned above will be additionally described below with reference to FIGS. 8 through 10C.

Figure 8:
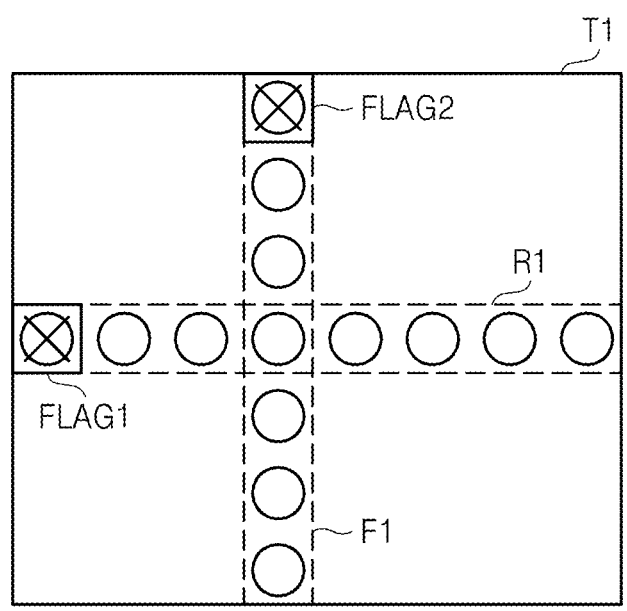
FIG. 8 is a diagram of an operation of a storage device when a data structure is deleted according to some embodiments of the inventive concepts.

FIG. 8 is a diagram of an operation of the storage device 20 when a data structure is deleted according to some embodiments of the inventive concepts. Referring to FIGS. 1 and 8, the first row R1 or the first field F1 included in the first table T1 may include a plurality of data.

When the host 10 deletes a data structure in a DB, a DB engine may perform only flagging without deleting all data of the deleted data structure in the DB. For instance, when the first row R1 is deleted, the DB engine may tag some data corresponding to the first row R1 with a first flag FLAG1. When the first field F1 is deleted, the DB engine may tag some data corresponding to the first field F1 with a second flag FLAG2.

The data structure deletion detector 211*a* or 211*b* may analyze flag information of at least one DB file in the storage device 20 and may detect whether a data structure had been deleted in the at least one DB file. The data structure deletion detector 211*a* or 211*b* may analyze the flag information of the at least one DB file in response to an input instructing to perform an auto advanced-trim operation from the host 10 or during an idle time of the host 10 or at a desired (or, alternatively predetermined) time. The at least one DB file may be every DB file in the storage device 20 or a DB file selected according to an input from the host 10.

FIG. 9 is a diagram of flag information stored in a data structure according to some embodiments of the inventive concepts. Referring to FIGS. 6 and 9, the data structure deletion detector 211*a* or 211*b* may store flag information of DB files in a data structure, e.g., in a queue. The queue may store position information of each flag. The queue may also store information about what data structure (e.g., table, row, or field) each flag indicates.

Figure 10A:
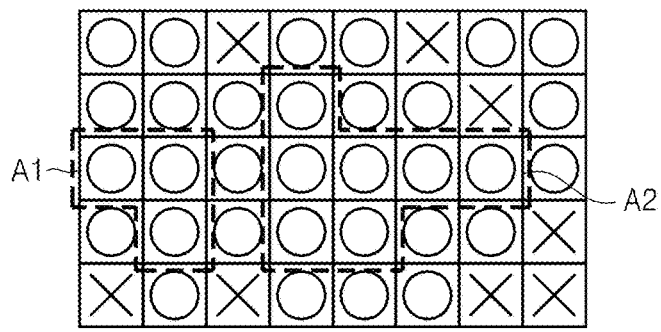
FIGS. 10A through 10C are diagrams illustrating the change in a state of a storage device according to the operations of an invalidator and a data shifter.
Figure 10B:
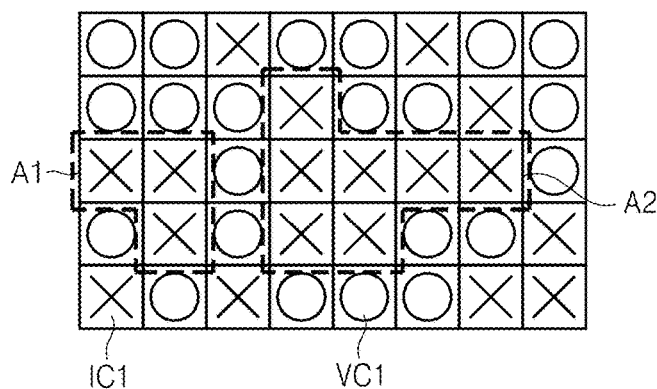
Figure 10C:
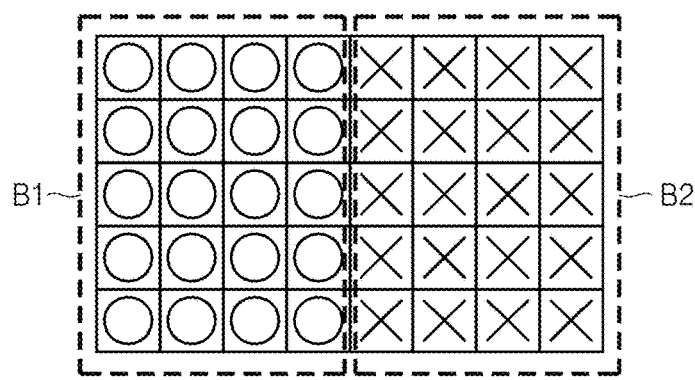

FIGS. 10A through 10C are diagrams illustrating the change in a state of the storage device 20 according to the operations of the invalidator 213 and the data shifter 215. In FIGS. 10A through 10C, each square box indicates a cell in an NVM, mark "O" indicates that a cell is valid, and mark "X" indicates that a cell is invalid.

Referring to FIGS. 1, 6, 7, and 8 and FIGS. 10A through 10C, the invalidator 213 may invalidate cells storing the data structure according to flag information. For instance, when the first row R1 and the first field F1 in the first table T1 are deleted, the data structure deletion detector 211a or 211b may store information of the first flag FLAG1 corresponding to the first row R1 and information of the second flag FLAG2 corresponding to the first field F1 in a queue. The invalidator 213 may invalidate cells in a first region A1 corresponding to the first flag FLAG1 and cells in a second region A2 corresponding to the second flag FLAG2 according to the queue.

The invalidator 213 may invalidate at least one cell that stores an address of a flag included in a DB file. For instance, the invalidator 213 may invalidate cells that store an address of either the first flag FLAG1 or the second flag FLAG2.

The data shifter 215 may shift data of a cell that has not been invalidated to at least one of the cells invalidated by the invalidator 213. For instance, the data shifter 215 may shift data of a cell that has not been invalidated to at least one of invalidated cells according to the flag position pattern of the DB file. The data shifter 215 may also shift data of a valid cell to at least one of the other invalid cells. For instance, the data shifter 215 may shift data of a first valid cell VC1 to a first invalid cell IC1.

As a result of the data shifting, valid cells and invalid cells may be collected in different blocks. For instance, a first block B1 may include only valid cells and a second block B2 may include only invalid cells. Thereafter, the storage device 20 erases the second block B2, thereby increasing the available capacity of the storage device 20.

The host 10 may restructure a file after the storage device 20 finishes the data shifting. For instance, when a 10-MB data structure in a 500-MB DB file is deleted, the DB file includes space (e.g., space included in the DB file when the DB file is opened in text mode) corresponding to the deleted data structure, so the host 10 may still recognize the capacity of the DB file as 500 MB. When the host 10 restructures the DB file, the host 10 can recognize the capacity of the DB file as 490 MB and secure an available capacity of 10 MB.

As described above, the storage device 20 may support a trim function for invalidating cells storing a file upon deletion of the file and an advanced-trim function for invalidate cells storing a data structure upon deletion of the data structure in a file.

When the storage device 20 receives and processes a command related with file deletion and a command related with deletion of a data structure in a file, the storage device 20 may perform the trim function and the advanced-trim function according to priority set by the host 10 or a desired (or, alternatively a predetermined) priority. For instance, when the host 10 sets configuration to perform the advanced-trim function first, the storage device 20 may perform the advanced-trim function first and then perform the trim function.

Figure 11:
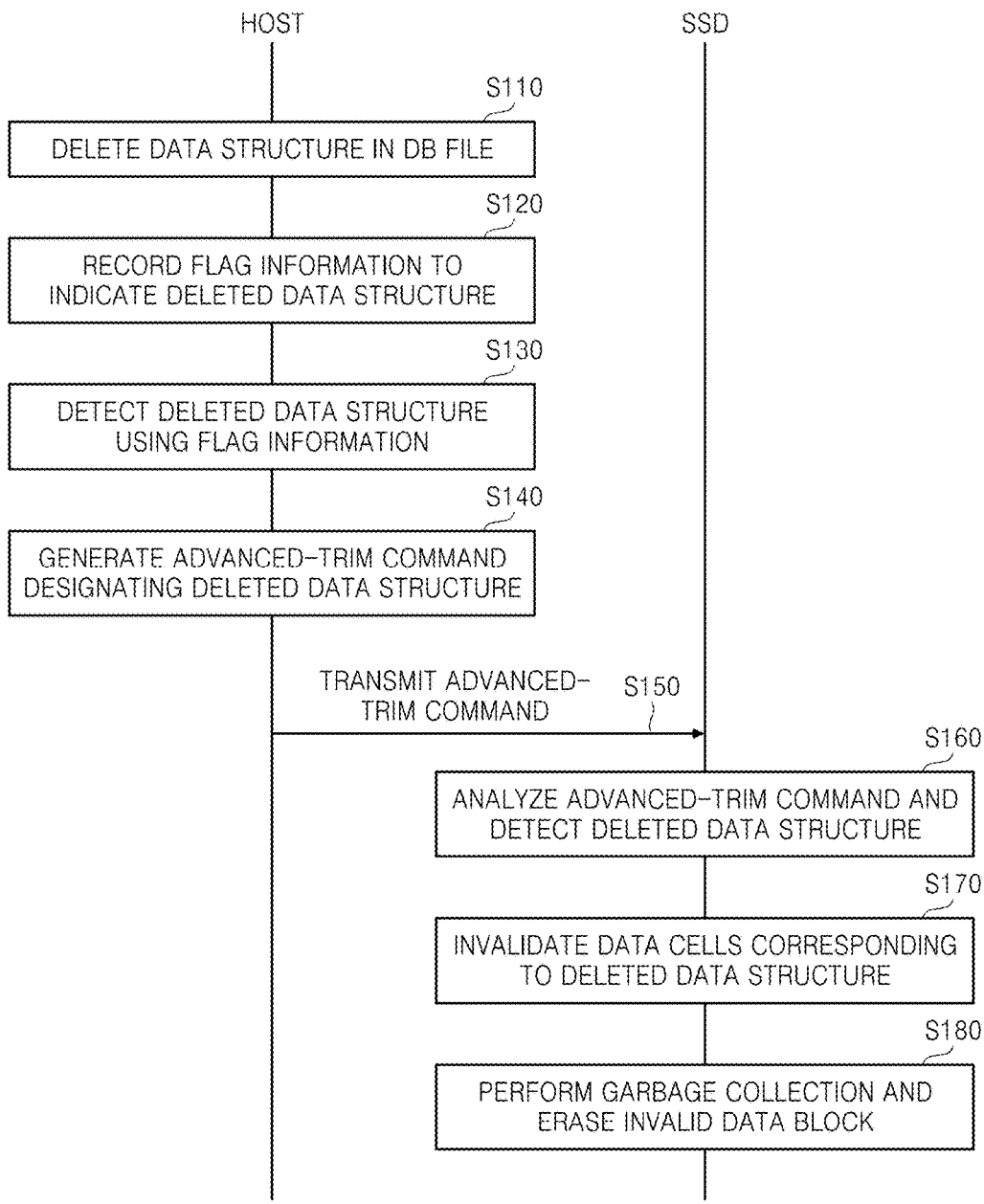
FIG. 11 is a flowchart of a method of operating a computer system according to some embodiments of the inventive concepts.

FIG. 11 is a flowchart of a method of operating a computer system according to some embodiments of the inventive concepts. The method may be performed in the computer system 1 illustrated in FIG. 1.

Referring to FIG. 11, when a data structure (e.g., a table, a row, or a field) in a DB file is deleted in operation S110, the host 10 records flag information in the DB file in operation S120 to indicate that the data structure has been deleted. The host 10 detects that the data structure (e.g., table, row, or field) has been deleted using the flag information in the DB file in operation S130, generates the advanced-trim command TRIM_A designating the deleted data structure in operation S140, and transmits the advanced-trim command TRIM_A to the storage device 20 in operation S150.

The storage device 20 (e.g., SSD) receives and analyzes the advanced-trim command TRIM_A including information corresponding to the deleted data structure from the host 10 to detect the deleted data structure in the file in operation S160. The storage device 20 invalidates data cells storing data corresponding to the deleted data structure, i.e., the data in the NVM 23 in operation S170. Thereafter, the storage device 20 may perform garbage collection to collect invalid cells (e.g., invalid page) or valid cells (e.g., valid page) in a data block and may erase an invalid data block, i.e., a data block that does not include any valid data in operation S180.

Figure 12:
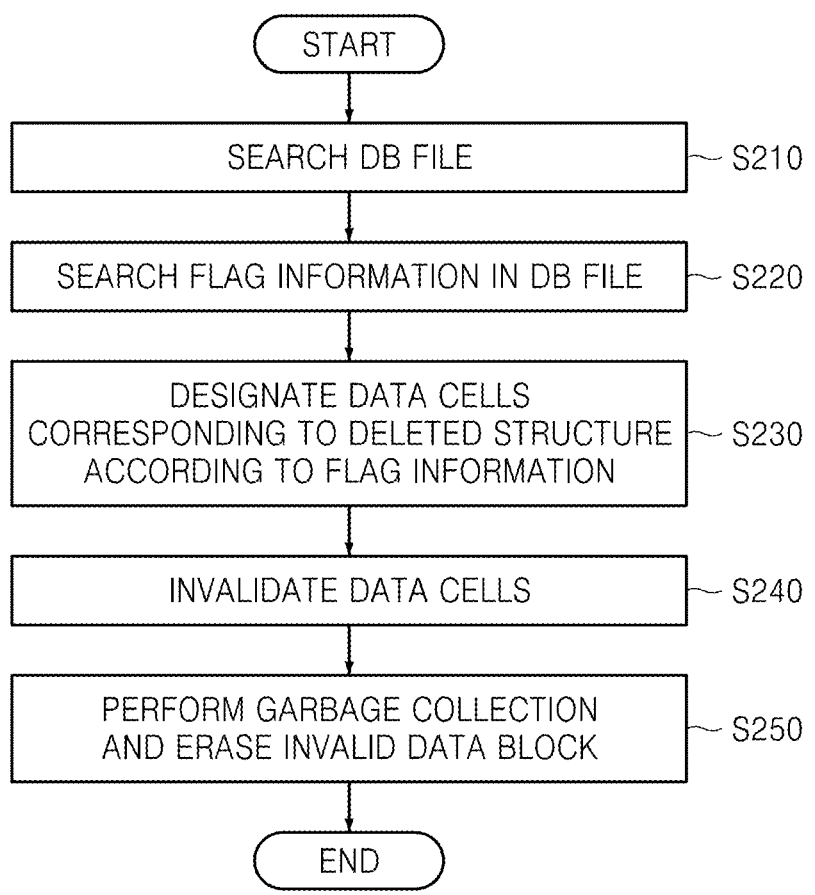
FIG. 12 is a flowchart of a method of operating a storage device according to some embodiments of the inventive concepts.

FIG. 12 is a flowchart of a method of operating the storage device 20 according to some embodiments of the inventive concepts. In particular, FIG. 12 illustrates a procedure in which the storage device 20 performs an auto advanced-trim function according to some embodiments of the inventive concepts.

The storage device 20 searches files stored in the NVM 23 for a DB file in operation S210. Although not shown, before operation S210, the host 10 may enable auto advanced-trim for the storage device 20 when the storage device 20 is powered on in order to enable the auto advanced-trim function.

The storage device 20 searches flag information in the DB file in operation S220 and designates data cells according to the flag information in operation S230 in order to invalidate data corresponding to a deleted data structure. Thereafter, the storage device 20 invalidates the designated data cells, i.e., real data corresponding to the deleted data structure in the NVM 23 in operation S240. Next, the storage device 20 may perform garbage collection to collect invalid cells (e.g., invalid page) or valid cells (e.g., valid page) in a data block and may erase an invalid data block, i.e., a data block that does not include any valid data in operation S250.

Figure 13A:
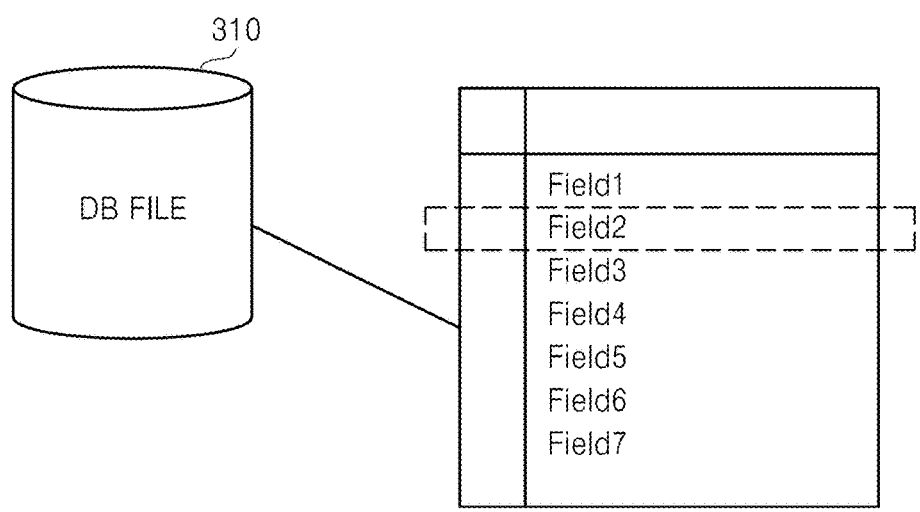
FIG. 13A is a diagram of a case where a field in a DB file is deleted.
Figure 13B:
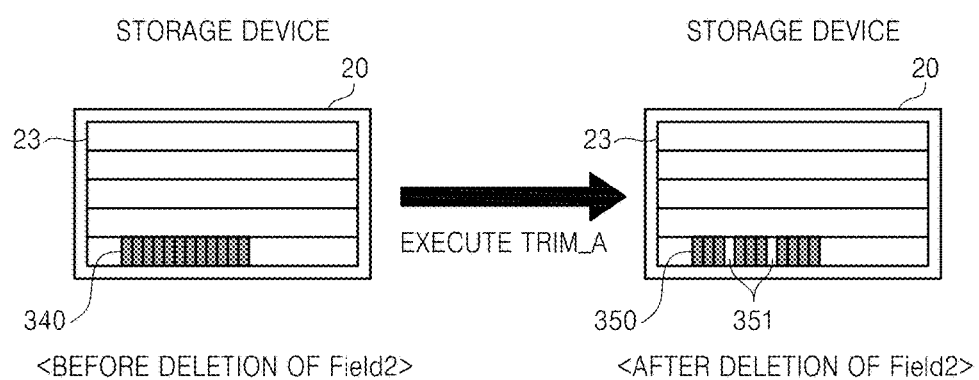
FIG. 13B is a diagram illustrating the change in a storage device when a field in a DB file is deleted, according to some embodiments of the inventive concepts.
Figure 13C:
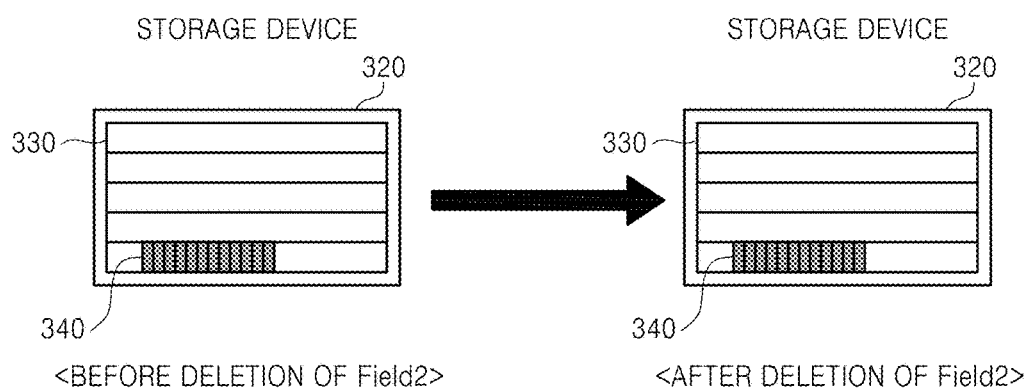
FIG. 13C is a diagram illustrating the change in a conventional storage device when a field in a DB file is deleted.

FIG. 13A is a diagram of a case where a field in a DB file is deleted. FIG. 13B is a diagram illustrating the change in the storage device 20 when a field in a DB file is deleted, according to some embodiments of the inventive concepts. FIG. 13C is a diagram illustrating the change in a conventional storage device 320 when a field in a DB file is deleted.

Referring to FIGS. 13A and 13B, a DB file 310 in the host 10 may include a plurality of fields Field1 through Field7. One, e.g., the field Field2 among the fields Field1 through Field7 may be deleted. In this case, an advanced-trim operation is performed in the storage device 20.

Before the field Field2 is deleted, that is, before the advanced-trim operation is performed; data corresponding to the DB file 310 have all been effectively stored in data cells of the NVM 23 in the storage device 20, as shown in a section 340. However, after the field Field2 is deleted, that is, after the advanced-trim operation is performed; data 351 corresponding to the deleted field Field2 among the data corresponding to the DB 310 are invalidated, as shown in a section 350.

Referring to FIGS. 13A and 13C, even when one, e.g., the field Field2 among the fields Field1 through Field7 in a DB file 310 of the host 10 is deleted; there is no change in NVM 330 of the conventional storage device 320.

As described above, according to some embodiments of the inventive concepts, a storage device performs an operation corresponding to trim (e.g., an operation of invalidating cells storing a data structure) upon deletion of the data structure in a file, thereby increasing the available capacity and data write speed of the storage device.

While the inventive concepts has been particularly shown and described with reference to example embodiments thereof, it will be understood by those of ordinary skill in the art that various changes in forms and details may be made therein without departing from the spirit and scope of the inventive concepts as defined by the following claims.

What is claimed is:

1. A computer device for controlling a storage device based on non-volatile memory, the computer device comprising:
   a memory having computer-readable instructions stored therein; and
   at least one processor configured to execute the computer-readable instructions to cause the computer device to,
      detect whether a data structure in a database file has been deleted using an identifier recorded in the database file to indicate whether the data structure is deleted or not,
      generate an advanced-trim command comprising information corresponding to the deleted data structure, the advanced-trim command being a command for invalidating cells of the non-volatile memory that stores the deleted data structure when the data structure in the database file is deleted due to modification of the database file at the computer device, the advanced-trim command being different from a trim command for invalidating cells of the non-volatile memory that stores the database file when the database file is deleted at the computer device, and
      transmit the command to the storage device.

2. The computer device of claim 1, wherein the data structure is one selected from the group consisting of a table, a row, and a field.

3. The computer device of claim 1, wherein the at least one processor includes a database engine configured therein, and the database engine is configured to perform the detection and the generation.

4. The computer device of claim 1, wherein:
   the at least one processor includes a database engine and a filter driver configured therein;
   the filter driver is configured to perform the detection and the generation; and
   the filter driver is configured to generate the advanced-trim command according to a file modification command output from the database engine.

5. A computer system comprising:
   the computer device of claim 1; and
   the storage device,
   wherein the database file is a structured query language (SQL) database file and the storage device is a solid state drive (SSD).

6. The computer system of claim 5, wherein the storage device comprises:
   a main memory, the main memory being the non-volatile memory; and
   a controller configure to,
      detect whether the data structure in the database file stored in the non-volatile memory is being deleted, and
      invalidate cells in the main memory corresponding to the data structure.

7. The computer system of claim 6, wherein the controller is further configured to detect the data structure based on the advanced-trim command.

8. The computer system of claim 6, wherein the controller is further configured to detect the data structure based on flag information stored in the database in association with the data structure.

9. The computer system of claim 5, wherein the storage device comprises:
   a controller configured to invalidate the non-volatile memory cells that store the deleted data structure,
   wherein the data structure has a smaller capacity than the database file.

10. The computer system of claim 9, wherein the controller is configured to invalidate the non-volatile memory cells during an idle time of the computer device.

11. The computer system of claim 9, wherein the controller is configured to shift data of a cell that has not been invalidated to at least one of the non-volatile memory cells that have been invalidated.

12. The computer system of claim 9, wherein:
   the controller is configured to receive the advanced-trim command, the advanced-trim command comprising information corresponding to the deleted data structure from a host, and detect whether the data structure in the file has been deleted according to the advanced-trim command; and
   the invalidator is configured to invalidate the cells that store the deleted data structure according to the information corresponding to the deleted data structure.

13. The computer system of claim 9, wherein:
   the storage device is configured to perform a trim function to invalidate cells storing the database file according to the trim command, and perform an advanced-trim function to invalidate cells storing the data structure according to the advanced-trim command.

14. The computer system of claim 9, wherein the storage device further comprises:
   a three-dimensional memory array.

15. The computer device of claim 1, wherein the advanced-trim command includes a name and an address corresponding to the deleted data structure, and address information corresponding to a portion modified in the database file.

16. The computer device of claim 15, wherein the address information corresponding to the portion modified in the database file includes at least one of a start address, a data size, or an end address thereof.

17. The computer device of claim 1, wherein the at least one processor is further configured to cause the storage device to perform a trim operation in response to the advanced-trim command.

18. The computer device of claim 1, wherein the identifier is flag information including corresponding position information and corresponding data structure type information.

19. The computer device of claim 1, wherein the at least one processor is further configured to cause the cells of the non-volatile memory that store the deleted data structure to be invalidated during an idle time of the computer device.

* * * * *